United States Patent [19]

Scheffler et al.

[11] Patent Number: 4,581,887

[45] Date of Patent: Apr. 15, 1986

[54] PULSATION VALVE

[75] Inventors: Charles E. Scheffler, Macomb; Richard E. McClelland, Imlay City, both of Mich.

[73] Assignee: The United States of America as represented by the Secretary of the Army, Washington, D.C.

[21] Appl. No.: 662,485

[22] Filed: Oct. 19, 1984

[51] Int. Cl.[4] .............................................. F02C 7/12
[52] U.S. Cl. ................................. 60/39.83; 165/109.1; 415/116
[58] Field of Search ................... 60/39.07, 39.83, 39.75; 415/115, 116, 177, 178; 165/96, 109 R, DIG. 11, 84

[56] References Cited

U.S. PATENT DOCUMENTS 2,749,087  6/1956  Blackman et al. ............. 60/39.83 X
2,951,337  9/1960  Atkinson et al. ............. 60/39.75 X
4,416,111  11/1983 Lenahan et al. ............... 60/39.83 X
4,462,204  7/1984  Hull ................................... 60/39.07

FOREIGN PATENT DOCUMENTS 846950  9/1960  United Kingdom ................... 165/84
2103289  2/1983  United Kingdom ............... 60/39.83

Primary Examiner—Carlton R. Croyle
Assistant Examiner—Donald E. Stout
Attorney, Agent, or Firm—Peter A. Taucher; John E. McRae; Robert P. Gibson

[57] ABSTRACT

A valve mechanism for delivering time-spaced pulses of coolant air to cooling passages within a turbine engine. The mechanism is designed for varying the pulse frequency to ascertain the affect that pulse frequency variations have on the cooling effect. The valve mechanism is manufacturable at relatively low cost, using standard shelf components and easily machined parts.

5 Claims, 3 Drawing Figures

PULSATION VALVE

GOVERNMENT INTEREST

The invention described herein may be manufactured, used, and licensed by or for the Government for governmental purposes without payment to me of any royalty.

BACKGROUND AND SUMMARY

This invention relates to a valve having special utility for controlling flow of coolant gas (air) to or through the blades of high speed turbines, especially turbine wheels used in hot gas turbine engines.

The turbine blades (wheels) in hot turbine engines customarily operate at relatively high temperatures, e.g., about 2,000° F. The service life (structural integrity) of such turbine wheels can be preserved/extended by passing a coolant gas (air) through passages in the blades. Cooling the turbine blades also tends to maintain small clearances between the blade tips and the passage surfaces, thereby improving turbine efficiency.

Under the present invention, it is proposed to provide a valve structure that can be used to supply a variable frequency pulsed flow of coolant air to the turbine blade system; presently preferred pulse frequency range is from steady state flow (no pulses) to 725 on-off pulse cycles per second. The valve will be designed to handle high pressure air at about 200 p.s.i.g., at temperatures up to about 900° F. The valve flow passage will be a circular straight-through passage offering minimum obstruction to fluid flow.

The purpose in providing a pulsing flow, as opposed to a steady constant flow, is to artificially generate scrubbing turbulence on the blade surfaces (passages) and thereby improve the heat transfer efficiency.

The principal object of the invention is to provide a pulsation valve that can be incorporated into an existing turbine engine at minimum expense. The valve is designed to be manufacturable at relatively low cost, using as many standard shelf components as possible. The valve is designed to serve as a test mechanism for investigating the effect that varying the pulsation frequency has on blade cooling efficiency.

THE DRAWINGS

THE DRAWINGS IN GREATER DETAIL

Figure 3:
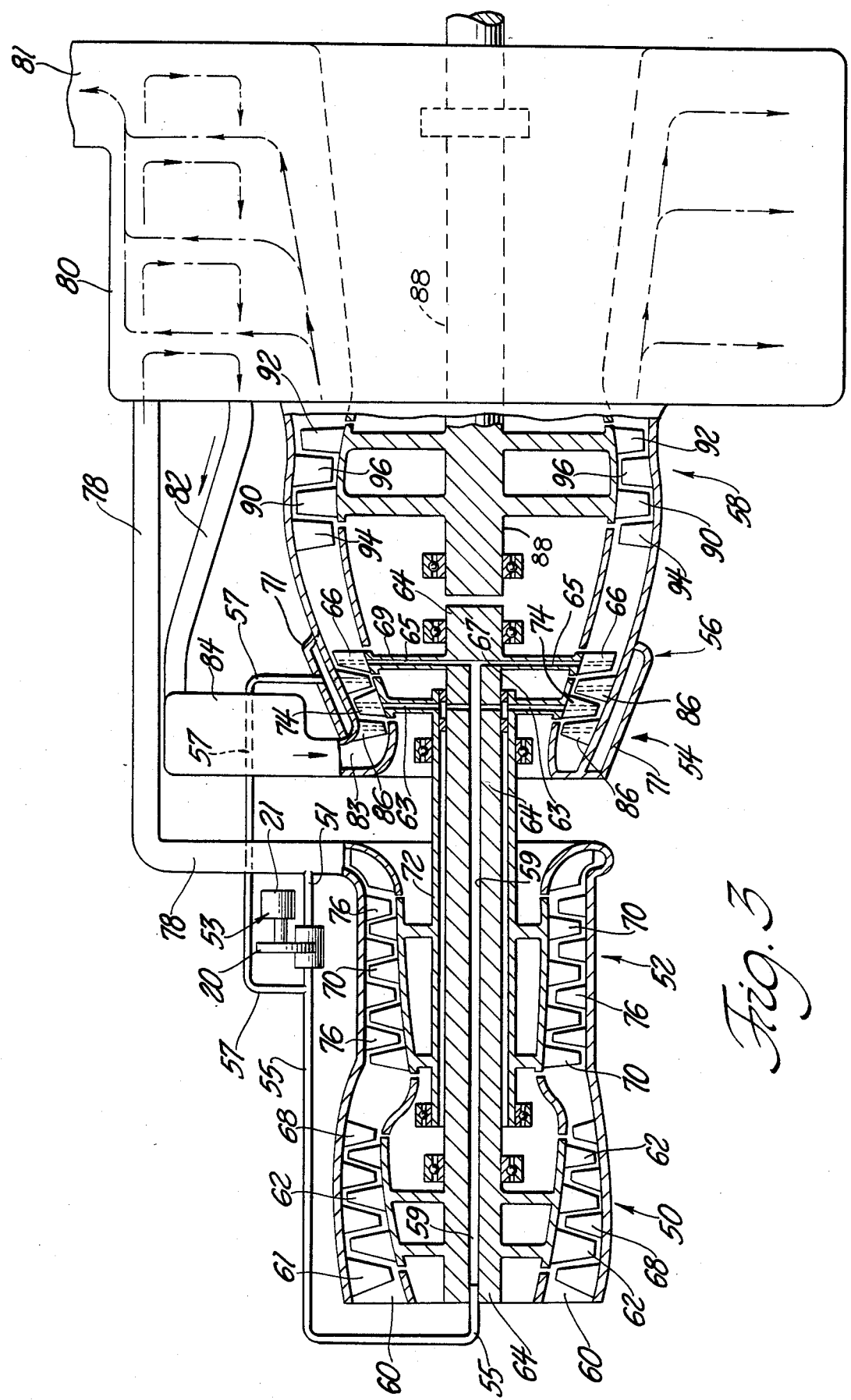
FIG. 3 is a schematic view of a turbine engine having the FIG. 1 valve incorporated therein.

It is believed that the operation and purpose of our improved valve can best be understood by first describing a typical turbine engine and turbine cooling system with which the valve would be used. FIG. 3 shows such an engine and associated cooling system.

Turbine Engine Construction

FIG. 3 schematically illustrates a hot gas turbine engine adapted to utilize our pulsation valve. The engine is an existing structure developed by others prior to our invention.

Briefly stated, the engine comprises a low pressure compressor section 50, a high pressure compressor section 52, a high pressure turbine section 54, a lower pressure turbine section 56 and a power turbine section 58.

Referring to compressor section 50, air at a low temperature, e.g., 100° F., enters annular inlet 60 that is equipped with adjustable guide vanes 61. Compressor blades 62 are suitably carried on a rotary shaft 64 that is driven by turbine blades 66 (in section 56). Stator blades 68 interact with blades 62 to convert flow energy into pressure energy.

In high pressure compressor section 52, rotor blades 70 are carried on an annular (tubular) shaft 72 that is driven by turbine blades 74 in turbine section 54. Stator blades 76 interact with blades 70 to convert flow energy into pressure energy.

High pressure gas is discharged into conduit 78 that leads to an annular plate-type heat exchanger (regenerator) 80, where it is preheated to a high temperature, e.g., 1050° F., by thermal contact with high temperature gases discharged by the blades of turbine section 58. Exhaust gases are discharged from the heat exchanger through an outlet opening 81.

Air, heated to about 1050° F. in heat exchanger 80, is fed through conduit 82 to a can-type combustor 84, where it is further heated, e.g., to about 2180° F. High temperature gases are passed into conduit 83 and then through turbine blades 74, 66 and stator blades 86 in turbine sections 54 and 56.

Useful mechanical power is developed in shaft 88; the driving force is developed by turbine blades 90 and 92 in turbine section 58. Stator blades 94 and 96 improve the system efficiency.

Turbine Engine Cooling System

The FIG. 3 turbine engine is provided with a pressurizable air passage system for cooling the components exposed to the highest operating temperatures, especially blades 86, 74 and 66 in turbine sections 54 and 56. The necessary air passage system comprises a duct 51 originating at conduit 78. Air, at a pressure of about 200 p.s.i., flows leftwardly through duct 51 and pulsation valve 53 to branch ducts 55 and 57.

Valve 53 preferably includes a circular disc 20 mounted for high speed rotation by means of a variable speed electric motor 21. Flow openings in the disc sequentially register with flow openings in the valve housing to alternately pass or obstruct air flow through valve 53. The valve output is passed to branch ducts 55 and 57.

Duct 55 constitutes a coolant supply passage for turbine blades 74 and 66. Duct 57 constitutes a coolant supply passage for stator blades 86.

Duct 55 has a slip-ring connection with a passage 59 extending axially within shaft 64, whereby coolant air is delivered through passage 59 to branch passages 63 and 65 in respective ones of turbine wheels 67 and 69. The associated blades 74 and 66 are formed with suitable coolant passages designed to extract heat from the blade surfaces exposed to the high temperature gases. Coolant air is discharged through suitable holes in the blade tips and/or blade trailing edges.

Aforementioned duct 57 connects with a jacket 71 formed around the flow passage area containing stator vanes 86. Pressurized coolant air flows from duct 57 into the jacket, thence through coolant passages formed in the stator vanes. Spent coolant may be discharged through openings formed in the inner wall of the flow passage.

The described coolant system may be considered to be conventional except for the presence of valve 53. Valve 53 constitutes our contribution to the turbine cooling field.

Valve 53 Construction

Figure 1:
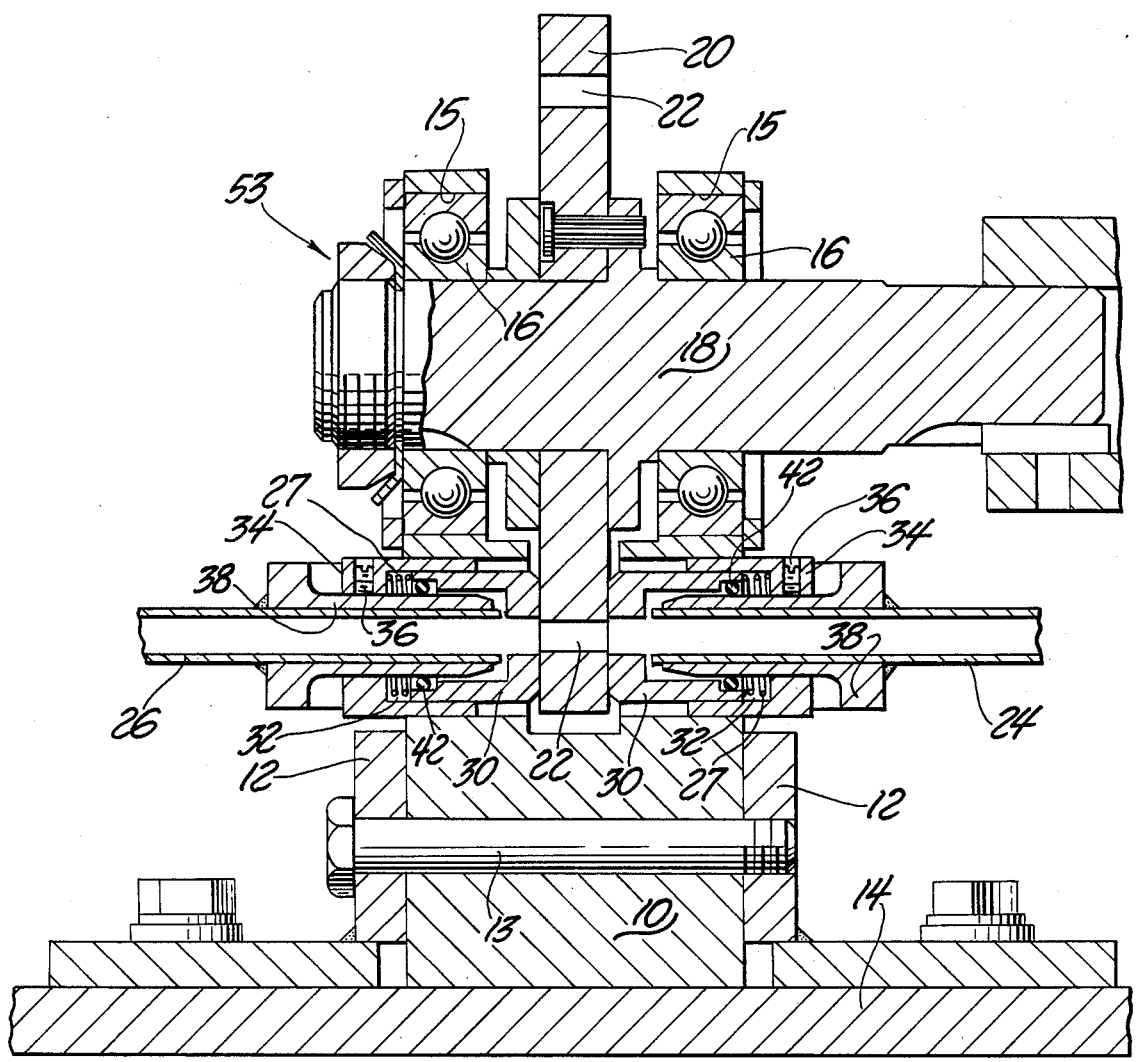
FIG. 1 is a sectional view of a pulsation valve according to our invention.
Figure 2:
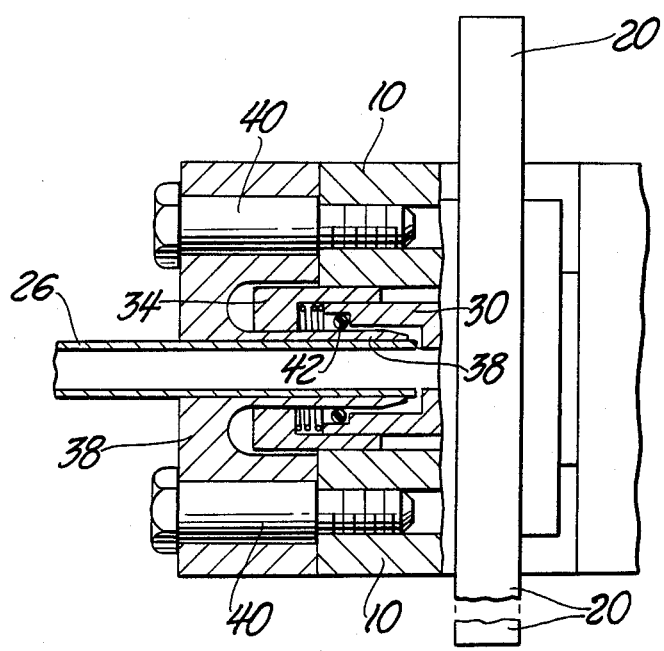
FIG. 2 is a fragmentary top plan view of the FIG. 1 valve, with parts thereof broken away to show interior details.

The valve shown in FIGS. 1 and 2 of the drawings is to be used primarily to investigate the effect that pulsing the coolant gas has on the efficiency of the blade cooling process. It is known that heat transfer through a flowing gas film is improved by generating turbulence in the gas stream (i.e., improving the scrubbing action on the heat transfer surface). We believe we can advantageously affect (improve) the heat transfer rate. Valve 53 is designed to produce a variable pulse frequency so that we can determine what effect, if any, the pulse frequency has on heat transfer efficiency.

The valve shown in FIGS. 1 and 2 comprises a stationary block 10 positioned between two upstanding plates 12 carried on a base plate 14; three bolts 13 hold block 10 in position.

Block 10 has a large circular hole 15 drilled therethrough to receive antifriction bearings 16, 16 for a shaft 18. An electric motor (not shown) is arranged to drive shaft 18 at selected (but adjustable) rate of speed, ranging for example from zero (motionless) up to about 2200 revolutions per minute. Conventional motor control means, not shown, will be used to vary the motor speed.

Shaft 18 carries a circular disk 20 that is equipped with a large number of thru-openings 22 arranged equidistantly near the disk periphery. The number of openings 22 is not critical. For example, we contemplated a disk having twenty such openings. When a given opening 22 is in the so-called six o'clock position, it registers with two aligned tubes 24 and 26 designed to conduct compressed air flowing from the compressor to the turbine (as in FIG. 3).

The valve is in a flow-open condition when an opening 22 is aligned with tubes 24 and 26; tubes 24 and 26 constitute component parts of the aforementioned duct 51 (FIG. 3). The valve is in a flow-closed condition when the disk wall interrupts the line-of-sight connection between tubes 24 and 26. Assuming that disk 20 has twenty openings, there will then be 20 on-off air pulses through the valve for each disk revolution.

To prevent leakage of compressed air at the disk-tube interface, each tube (24 or 26) is equipped with a spring-urged rubbing block 30 of annular configuration. Each block has a flat end face arranged to lightly rub against the face of disk 20 with sufficient force to preclude significant leakage across the disk-block interface. Slight variations in disk flatness are taken care of by these rubbing blocks (face seals). A small compression spring 27 is arranged in each annular space 32 to apply a biasing force on the associated rubbing block.

The effective force of each spring is controlled or varied by an annular spring seat element (collar) 34 having a set-screw lock adjustment 36 on a stationary element 38 carried by the associated tube 24 or 26. As best seen in FIG. 2, element 38 is mounted to aforementioned block 10 by bolts 40. O-ring seals 42 prevent leakage from the hole formed in each associated rubbing block 30.

The valve is believed to have the following general advantages:

1. Relatively high range of pulse frequencies (e.g., 0-725 pulse/sec.), merely by varying the speed of motor shaft 18. Motor speed is a parameter that can be quite closely regulated with present day instruments.

2. Capable of manufacture in-house without special tooling (standard shelf components and screw machined components).

3. Straight-through flow, with minimum pressure loss (or leakage).

4. Valve settings capable of being repeated merely by adjusting the valve motor speed; minimum chance for the valve to get out of adjustment due to wear or service.

5. Relatively sharp high amplitude pulse curves due to the way that disk openings 22 slice across the flow passage.

6. Valve disk is operable at a fairly high rate of speed without wear or damage to seals. Valve has no reciprocating parts subject to high inertial loadings.

The pulsation valve is intended to produce sharp pulsations in the coolant air streams flowing through ducts 55 and 57 (and the associated coolant passages in blades 86, 74 and 66). It is believed that the pulsating nature of the flow will improve heat transfer by increasing the turbulent scrubbing action of the coolant air on the coolant passages within the various blades.

FIG. 3 shows one pulsation valve 53 for two coolant supply ducts 55 and 57. If desired, a pulsation valve could be provided for (in) each supply duct; in that case, a different pulsation frequency could be used for each duct, as necessary to achieve optimum heat transfer action in the various blades 74, 66 or 86, 86.

I wish it to be understood that I do not desire to be limited to the exact details of construction shown and described for obvious modifications will occur to a person skilled in the art, without departing from the spirit an scope of the appended claims.

We claim:

1. In a turbine engine that includes a compressor section, a turbine section, and means for cooling selected surfaces in the turbine section, said cooling means comprises a duct extending from the compressor section output passage for supplying pressurized coolant air to said selected surfaces: the improvement comprising a pulsation valve located in said duct for causing the pressurized air to have a pulsating type flow; said pulsation valve comprising a circular disk mounted for rotation on its central axis, said disc having a series of flow passages therethrough spaced a common distance from the disc rotational axis, two axially aligned rubbing blocks having rubbing engagement with opposite faces of the circular disk, means biasing individual ones of the rubbing blocks into rubbing engagement with the disc faces, said rubbing blocks having flow openings therethrough defining a flow axis offset from the disc rotational axis, said rubbing blocks being oriented so that during rotary movement of the disc successive ones of the disc flow passages register with the flow openings in the rubbing blocks.

2. The improvement of claim 1 wherein the pulsation valve comprises a variable speed motor operatively connected to the disc for rotating same at a relatively high rotational speed.

3. The improvement of claim 1 wherein each said biasing means comprises a coil spring.

4. In a turbine engine that includes a compressor section, a turbine section, and means for cooling selected surfaces in the turbine section, said cooling means comprising a duct extending from the compressor section output passage for supplying pressurized coolant air to said selected surfaces: the improvement comprising a pulsation valve located in said duct for causing the pressurized air to have a pulsating type flow; said pulsation valve comprising block means having aligned bearings therein, a circular disc positioned between the bearings, said disc having a central shaft extending through the bearings to mount the disc for rotation around the axis defined by the bearings; two aligned annular rubbing blocks slidably positioned in the block means for motion parallel to the disc rotational axis; said blocks being oriented to engage opposite surfaces of the disc, spring means associated with each rubbing block for biasing same into frictional fluid-seal engagement with a disc surface; each rubbing block having an opening therethrough constituting a flow passage; said disc having a series of flow openings spaced a common distance from the disc rotational axis, the disc flow openings being spaced equi-distantly from one another inwardly from the disc periphery; the rubbing blocks being spaced from the disc rotation axis such that during disc rotation, successive ones of the disc flow openings register with the openings in the aligned rubbing blocks.

5. The improvement of claim 4 wherein said pulsation valve comprises a variable speed electric motor drivingly connected to the aforementioned shaft for effecting rotation of the disc.

* * * * *